United States Patent [19]

Bernard et al.

[11] Patent Number: 4,863,123

[45] Date of Patent: Sep. 5, 1989

[54] PROCESS AND SYSTEM FOR LOCALIZING A MOBILE UNIT WHICH TRAVELS ON A SYSTEM OF RAILROADS

[75] Inventors: Patrice Bernard, Paris; Daniel Lancien, Le Raincy; André Gazet, Quincy Sous Senart, all of France

[73] Assignee: Societe Nationale Des Chemins De Fer Francais, Paris, France

[21] Appl. No.: 102,066

[22] Filed: Sep. 1, 1987

[30] Foreign Application Priority Data

Jan. 7, 1986 [FR] France ................ 86 00117

[51] Int. Cl.$^4$ ............................................. B61L 23/34
[52] U.S. Cl. ..................... 246/122 R; 246/246; 246/270 R; 340/933; 340/988
[58] Field of Search ............... 246/1 C, 122 R, 123, 246/124, 246, 249, 270 R, 292, 297; 340/933, 988

[56] References Cited

U.S. PATENT DOCUMENTS

| | | | |
|---|---|---|---|
| 2,432,984 | 12/1947 | Budenbom | 342/6 |
| 3,108,771 | 10/1963 | Pelino et al. | 246/246 |
| 3,316,400 | 4/1967 | Dosch et al. | 246/122 R |
| 3,489,893 | 1/1970 | Roberts | 246/122 R |
| 3,559,820 | 2/1971 | Munson | 246/122 R |
| 3,581,071 | 5/1971 | Payseure | 246/122 R |
| 3,947,807 | 3/1976 | Tyler et al. | 340/23 |
| 4,151,969 | 5/1979 | Wood | 246/122 R |
| 4,508,298 | 4/1985 | Salmon | 246/122 R |

FOREIGN PATENT DOCUMENTS

| | | |
|---|---|---|
| 2430368 | 1/1976 | Fed. Rep. of Germany. |
| 2139471 | 1/1973 | France. |
| 2274094 | 1/1976 | France. |

*Primary Examiner*—Ronald C. Capossela
*Attorney, Agent, or Firm*—Sughrue, Mion, Zinn, Macpeak & Seas

[57] ABSTRACT

A process for localizing a mobile unit on a railway network, with a system that includes: a sensor (R) in the form of radar having an antenna (A) which is integral to the mobile unit and that cooperates with fixed markers (RP) placed alongside the railway track; a shaping circuit for a signal issued by the sensor; the radar being operative for measuring the distance traveled or the travel time; a database (BD) which contains the description of a graph of which knots or nodes represent the fixed markers and branches represent the railway tracks that connect them; and a circuit (OT) controlled by the shaped signal, connected to the radar and to the database, for determining the position of the mobile unit.

15 Claims, 1 Drawing Sheet

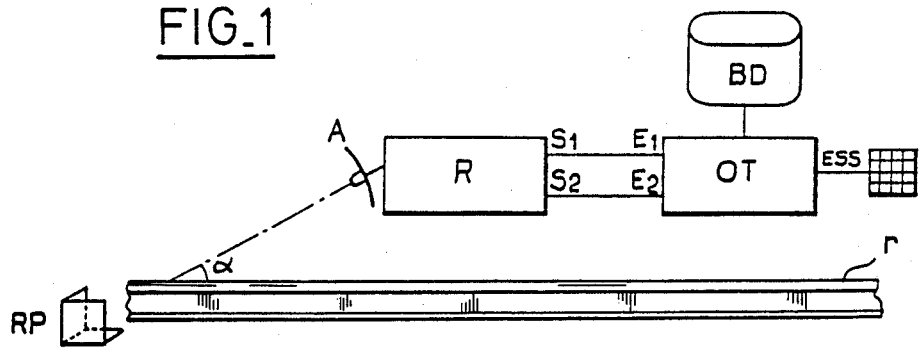
FIG_1
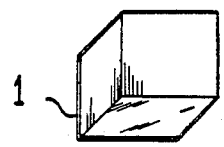
FIG_2
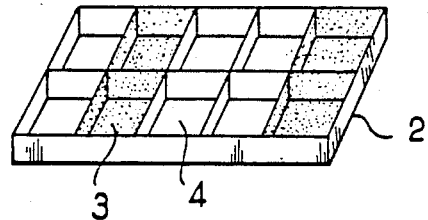
FIG_3
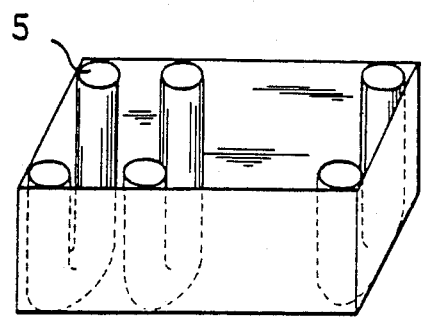
FIG_4
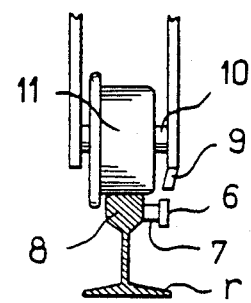
FIG_5

PROCESS AND SYSTEM FOR LOCALIZING A MOBILE UNIT WHICH TRAVELS ON A SYSTEM OF RAILROADS

BACKGROUND OF THE INVENTION

The present invention concerns a process for localizing a mobile unit on a network, and especially a process that makes it possible to localize with high accuracy the position of a mobile unit on a system of railroads, as well as a system for implementing such a process.

In order to localize a mobile vehicle on a railroad track, a known process consists of arranging detectors at specific points or sectors on the network, for instance electrical, electromagnetic or electronic circuits, placed on the track, and pedals that are probably associated as axle counters cooperating with the vehicle, etc.

However, such equipment which is linked to the infrastructure is costly, especially because of the high number of detectors required, and the investment often seems unproductive on low traffic density lines. Furthermore, knowledge of the position of the mobile unit is accurate only when it is in well determined areas on the line. In the areas between the well determined areas on the line, knowledge of localization is inaccurate and can become a hamper to the development of specific applications. Finally, knowledge of localization is locally available on the ground, but not directly on the mobile unit proper. In some instances, the detector tells the mobile unit that it is crossing at its level and sends it instructions pertaining, for instance, to speed limit or stopping distance. In those cases, for controlling speed or automatic piloting, the mobile unit can implement a measurement of the distance traveled, but it is not localization as such. Indeed, aside from the moment when the mobile unit crosses above the detector, the ground based system does not know exactly where the mobile unit is; whereas the mobile unit knows the distance traveled from the detector, but does not know its position in relation to the network as a whole. More importantly, the mobile unit it does not know which track it is on, within a network where several tracks might be contiguous.

Another known process consists of using a triangulation method with beacons, that can be static or mobile, and for instance loaded on board satellites placed in orbit.

This second process displays various inconveniences, aside from its high cost. Indeed, the available accuracy does not make it possible to distinguish, for certain, on which track of a network the mobile unit is located. Localization requires the possibility of a link, by radio usually, with the beacons, and irregularities in infrastructure relief, especially tunnels, do not make it possible to obtain good coverage of the network. Finally, at least in the case of radio-spotting, in other words when the ground based system acquires the knowledge of localization of the mobile unit, the ltter only obtains periodic knowledge of its position; it has to resort to estimation for constant monitoring of the speed or automatic piloting.

The patent FR 2 139 471 describes a control system for a vehicle that moves on a track divided into consecutive sections, which includes information on the distance traveled, thus making it possible to identify each section when the vehicle passes by. The patent FR 2 274 094 describes a device for localizing vehicles on a road network aimed especially at detecting changes in direction at crossroads.

SUMMARY OF THE INVENTION

It is an object of the invention is to provide a mobile unit on a railroad track network having accurate and constant knowledge of its position without requiring costly infrastructure, and especially to enable the identification of the track on which the mobile unit can be found, from among several neighboring tracks.

It is another object of the invention to provide a process which makes it possible to obtain the above result in a feasible and cost-effective way by avoiding inconveniences that are inherent to the previously mentioned known methods.

It is still a further object of the invention to provide also a localization system for a mobile unit on a network that ensures accurate and constant localization of the mobile unit, by making use of the current infrastructure of the network, or inferring only the establishment of simple and cost-effective markers.

The process according to the invention makes it possible to locate or localize a mobile unit that operates on a system of railroads which includes static or fixed markers in the vicinity of the track and is distinguished in that a sensor is employed that is integral with the mobile unit and which cooperates with the static markers so as to sense a characteristic signal emitted or returned by each static marker. Further, a database is included which contains the description of a graph of which the knots or nodes are the static markers and the branches the tracks that connect them. The lengths of the branches of the graph recorded in the database are compared either with the distances measured been markers, or, except for one factor, with the time separating the moments of detection of the characteristic signals, in order to deduce therefrom the position of the mobile unit.

According to an implementation form of the process of the invention, at least one radiation or signal source is employed which is integral to the mobile unit, such that during the motion of the mobile unit, the signal source scans the zone where the static markers are located. Further, a data base is employed which contains a graph of which the knots are the static markers and the branches the tracks that connect them. Also at least a receiver is employed which is integral to the mobile unit and is sensitive to the retrotransmitted signal.

In conformance with the process of the invention, the sensor or receiver cooperates with the static markers to we detect the crossing of the mobile unit close to the static markers by the characteristic signal which they emit or that they send back. Alternatively the digital signature of said characteristic signal is compared with the signatures linked to the knots of the graph that are recorded in the database, to deduce therefrom the position of the mobile unit. In a further alternative the distance traveled from the previous static is measured marker and and the compared to the length of the branch(es) of the graph starting from the previous knot, in the database.

According to a preferred embodiment, the identification of each static marker is used for retiming the estimated position of the mobile unit on the track. In conformance with another advantageous characteristic of the process, the static markers are executed so that the retrotransmitted response of the wave emitted by the radiation source is different according to the marker or the marker category, and the processing of the response makes it possible then to distinguish one marker from many other different markers or belonging to a different category.

The echo or reflected signals that are received are instantly processed directly on the mobile unit, by appropriate loaded means, or remotely, the link of the processing and comparison unit with the database, being performed by the usual means, for instance by radio.

For a radiation source, the use of radar makes it possible not only to detect static markers, but to measure the distance traveled. According to a variant of the invention, several beams can be emitted, for instance radar beams, with several antennae each of which is connected to a distinct radar or all are connected to the same radar. In particular two radar beams can be emitted that are symmetrical in relation to a plane which is perpendicular to the axis of the track, one to the front, the other to the rear, in relation to the direction of the motion of the mobile unit. If the first antenna emits a radiation which produces an a angle with the plane of the track, the second antenna is fastened on the mobile unit so as to form with the first an angle that equals 180° which is twice reduced from the nominal value of a, and thereupon the mean of received echo signals is computed.

The device according to the present invention includes:

- a sensor that is integral to the mobile unit, which cooperates with the static markers;
- a shaping circuit for the signal that comes from the sensor;
- means for measuring the distance traveled or the travel time;
- a database which contains the description of a graph of which the knots are the static markers and the branches the tracks that connect them and,
- a circuit that is controlled by the shaped signal, and connected to the means for measuring distance or time and to the database, which determines the position of the mobile unit.

According to an embodiment, the circuit that is controlled by the shaped signal determines the potential branches of the graph based on the last identified branch, and selects the one with a length that is closest to the distance measured between the two last detected markers, the position being defined by the selected branch and by the distance traveled on that branch.

It is especially advantageous to use a circuit, controlled by the shaped signal, which determines the possible branches based on the immediately preceding branch and assigning them a probability as a function of that of the upward branch of the anticipated branch and the measured distance, only retaining the n best branches, n being greater than or equal to 2, the position being defined by the most probable branch and the distance traveled on that branch.

According to an advantageous embodiment, the sensor is a receiver which is integral to the mobile unit, sensitive to the signal retrotransmitted by the static markers and emitted by a radiation source that is integral to the mobile unit which scans, during motion, the zone where the static markers are located.

Obviously, the specific sensors, which are the radiation sources, the particular signal shaping circuits, the particular circuits for assessing the possible branches of the graph, the particular means for measuring distance or time, and the particular databases do not figure in the framework of this invention and are of a type that is known in the art. For instance, the radiation source can be a radar, a laser, an ultrasound emitter, etc., mounted on the mobile unit and associated with an appropriate receiver. Static markers can also be employed that cooperate with a sensor that is integral with the mobile unit, and for instance points or magnets placed in the immediate vicinity of a rail of the railroad track, that cooperate with a sensor wheel or with a magnetic field sensor which is integral with the mobile unit, respectively.

According to a preferred embodiment, the system includes at least a radar which is connected at least to an antenna directed at the track and producing a set angle with it, the direction of the antenna enabling a scan of the zone where the characteristic static markers are located in the vicinity of the track, processing means for echo signals to measure the distance traveled from the departure point and the signal level, as well as the database and the circuit controlled by the signal, such as they were described above.

According to a simple embodiment, the static markers can be comprised of the contact line masts arranged along the track at a distance almost constant to the latter, in the case of electrified tracks. Generally speaking, it is also possible to use for markers all the singularities that arise on the track or in its immediate vicinity, of which the position will have been noted previously.

In conformance with another embodiment, the markers are comprised of trirectangular trihedra or assemblies of trihedra, either metallic or metallized, which send back an echo (for instance a radar echo) that is easy to distinguish from that of the environment of the track (rail, ballast, crossties and rail screws, for instance) by the simple measuring of the level of the retrotransmitted signal. The marker can also be embodied in the shape of an elbow-shaped pipe, with a diameter that is greater than the wave length of the radar beam, and arranged in such a way that the emitted signal penetrates through one end and the signal that comes out the other end is picked up by the radar antenna. In that case, the marker is recognizable as the polarizing of the signal, and the receiving antenna is formed in such a way that it displays the same polarization. Those markers are set far from one another along the track, in the field that is scanned by the radar antenna.

A marker can be elementary or composite. An elementary marker is characterized by the fact that a particular shape is not assigned to the curve which expresses the level of the retrotransmitted signal in relation to the path traveled by the sensor when it passes above the marker. A composite marker is characterized by the fact that a specific shape is assigned to that curve, either by the length of the zone above which a substantial retrotransmitted signal is obtained, or by the fact that this curve is comprised of the association of several curves corresponding to an elementary marker, this association being characterized by the number of elementary responses, by the distance that separates them or by a combination of those factors. A composite marker can be embodied, for instance, by a spider of metallic plates, the plates being perpendicular to one another and to a metal plate used as a bottom to form cells, some of the cells thus constituted being filled or covered by a substance that absorbs the signal emitted by the radiation source. Another likely embodiment is comprised of U-shaped pipes, the information being given by the number of pipes and their distances to one another.

When the railroad track includes a switch that makes it possible to either maintain the mobile unit on the direct track, or to deviate on to another track, it is important to identify precisely the track on which the mobile unit is located after passing by the switch. This assessment can be performed in conformance with the invention either by placing a marker on each branch of the switch at a different distance from the point, or by using markers which supply different emitted or retrotransmitted signals on both branches, or by not placing a marker on one of the branches. In the first case, the difference in distances is preferably greater than double the tolerated margin of error and the simple measuring of distance between the identified marker and the last previously recognized marker makes it possible to determine whether the mobile unit is on the direct branch or on the deviated branch by way of a comparison with the graph of the network which is recorded in the database.

BRIEF DESCRIPTION OF THE DRAWINGS

The characteristics and advantages of the invention will be provided in greater detail in the following description relating to preferred embodiment that is not restrictive, in reference to the attached drawings, which depict:

FIG. 1 is a bloc-diagram of an installation in conformance with the invention;

FIG. 2 is a diagrammatic view of a passive marker that can be used in the invention, which is placed on the railroad track;

FIG. 3 is a perspective view of a marker variant;

FIG. 4 is a view of another passive marker which can be used in the invention;

FIG. 5 is a diagram of a marker comprised of a magnet and an appropriate detection circuit.

DETAILED DESCRIPTION OF THE INVENTION

In FIG. 1, a radar R includes an antenna A, located at a height that equals from 60 cm above rail r and pointing towards the rail in a direction that produces a preset angle a of about 30° with the horizontal. The radar R supplies at its output S1 information on distance traveled extracted from the Doppler effect between the emitted signal and the retrotransmitted signal. The radar also supplies at its output S2 information that gives the level of the retrotransmitted signal. The outputs S1 and S2 are connected respectively to inputs E1 and E2 of a processing computer OT. This computer OT possesses, in a database BD, a description of the graph of passive markers RP placed on the track, in the immediate vicinity of the rail and in the zone illustrated by the antenna A during its passage above them. The computer OT also possesses an input/output ESS series which allows for dialogue with the outside (keyboard-monitor, modem, computer . . . ).

The signal shaping circuit stemming from the receiver section of the radar (not shown) is of the usual kind and can be included indiscriminately in the radar R or in the computer OT.

The operation is as follows: the processing computer OT receives at its input/output ESS series the indication of its initial position marked in relation to the graph that is contained in the database BD. When the device (i.e., the mobile unit) on which the localization system is mounted moves, the processing computer OT receives from radar R at its input E1 the signed value of elementary moves; that allows it to calculate the estimated position.

When the processing computer OT receives from radar R at its input E2 information telling it that the level of the retrotransmitted signal exceeds a preset threshold, the computer OT notes the estimated position. If that position corresponds, except for a factor that is included within the preset tolerance limits, to the position of a passive marker RP such as it is indicated in the database BD, it is determined that the echo does correspond to the marker and a correction is made for the estimated position of the value found for the margin.

FIG. 2 shows an elementary marker (1) which is comprised of a metallic trihedron while FIG. 3 shows a composite marker which includes an assembly (2) of metallic trihedra that comprise a unit with several cells of which some (3) are coated with a substance that absorbs the signl emitted by the radar while others (4) are not. FIG. 4 shows markers (5) which are comprised of U-shaped elbow pipes that are placed vertically close to the track.

The use of composite markers makes it possible to distinguish each passive marker RP with a recognizable "signature". We can envision that each passive marker RP has a signature which makes it possible to distinguish it from all the others or a signature that makes it possible to distinguish it only from the passive markers in its vicinity with which confusion might be likely.

In particular, he use of composite markers makes it possible to distinguish the direct branch from the deviated branch of a switch without having to rely on the difference between the distance that separates the previous marker and the passive marker that is located in the direct branch, on the one hand, and the distance separatingthe previous marker and the passive marker which is located on the deviated branch, on the other hand. Similarly, the signature of a passive marker can also be used to indicate the traveling direction of the track.

The database BD can contain, aside from information which makes it possible to know the position of the various passive markers, an indication of the signature of the passive markers.

As previously stated, the radar R is located at a small height above the rail. That height can vary and be included for instance between 30 cm and 1.50 m, and preferably between 40 and 60 cm. The angle a of the radar beam with the plane of the track is preferably less than 45° and for instance can be close to 30° in order to supply an accurate and reliable measurement. The position of the radar antenna is preferably above the rail, but it can vary in relation to the axis of the track, especially if the possibility of snow covering the track is not a concern. The radar R might especially be positioned above the middle of the track; in that case, the passive markers RP should also be in the middle of the track.

However, if it is preferred to place the radar R above a stretch of rails, it can be convenient to place passive markers RP in the vicinity of each stretch of rails. In that case, it can also be advantageous to install the passive markers on each stretch of rails more or less perpendicular to one another; it can also be convenient to assign them related signatures, for instance identical to one another, or else identical, except for traffic direction.

A concern of availability can lead to the placement of a radar above each stretch of rails. In a case where the two radars are operating properly, the comparison of information supplied by each of them at the output S1 provides another source of information that makes it possible, either to retime the estimated position, or to verify its probability. Indeed, except for the inaccuracy of the measurement of the path traveled, and for the error introduced by a probable cant of the track, the difference between the measurement of the path traveled on each of the two stretches of rails provides, after dividing by the spacing of the track, the course variation (in radians) from the source of the measurements. If the direction of the track is included in the database BD in some locations, then a possible coherence test is available. A variant consists of clarifying in the database the beginning and the end of significant curves and the difference in length of the stretches of rails between those two points (which eliminates the influence of the cant). The difference in the estimates of the traveled path from the outputs S1 of the two radars allows, through a comparison with the information supplied by the database BD, an interesting control of the validity of the position and of the good operation of the processing. Practically speaking, it is possible to mark with certainty only the curves of which the radius is less than the ratio between the spacing of the two radars and twice their relative accuracy.

As shown in FIG. 5, a magnet (6) is fastened on the rail (r) by way of a clamp (7) which maintains the magnet about 3 cm from the rail. The fastening is accomplished with a conventional an usual means, for instance by gluing, on the outer side of the rail head (8).

An electromagnetic detector (9) is fastened on the axle box (10) of the wheel (11) so that the distance between the magnet (6), pointed vertically, and the detector (9) is included between about 1 cm and 5 cm, during the passage of the detector above the magnet. The detector (9) is protected by a shield (not shown).

The magnet (6) is a permanent magnet of the usual kind, for instance of the kind made of an aluminum, nickel and cobalt-based alloy that displays good stability in the long run. The magnetic field thus created is detected by the detector (9) which can include for instance a variable reluctance coil, a Foucault current sensor, or a Hall effect sensor, according to a known assembly (not shown).

While a single permanent magnet is adequate, it is also possible to mount several magnets several centimeters from one another and to direct their polarities in a preset way in order to constitute a signature that can be identified by the detector.

In the foregoing description, it is presumed that the database BD is loaded on board the mobile unit that is to be located or localized. It is obvious that nothing fundamental is altered if that database is far away, for instance if it is on the ground and there is a radio link between the processing computer OT on board the mobile unit and the ground system that manages that database. Neither is anything fundamental altered if the database is on the ground but the excerpts pertaining to the region where the mobile unit is located are sent to it, as need be, by a radio link or localized beacons for instance. Another interesting use of radio signals is the transmission of changes pertaining to the presence of passive markers, their position or their signature, which have intervened since the time to which the distance BD version corresponds and that in which the mobile unit possesses. The invention obviously covers those different variants.

We claim:

1. In a process for locating a mobile unit which travels on a network of radilroad tracks, said network including a plurality of spaced-apart, fixed markers disposed on or near the tracks, and said mobile unit having a sensor disposed thereon, said process comprising the following steps:
   (a) sensing a characteristic signal in cooperation with each of said fixed markers as said mobile unit passes in close proximity to a corresponding one of said fixed markers;
   (b) measuring a distance traveled by said mobile unit between said fixed markers;
   (c) storing in a database a description of said network in the form of a graph wherein nodes represent said fixed markers and branches connecting the nodes represent said tracks; and
   (d) comparing the lengths of said branches which are stored in said database with the distances measured between said fixed markers to thereby obtain the location of said mobile unit in said railroad network.

2. A process according to claim 1, wherein said sensing step involves sensing said characteristic signal emitted by said static markers.

3. A process according to claim 1, wherein said sensing step involves sensing said characteristic signal reflected back by said static markers.

4. In a process for locating a mobile unit which travels on a network of railroad tracks, said network including a plurality of spaced-apart, fixed markers disposed on or near the tracks, and said mobile unit having at least one source of radiation disposed thereon for emitting a signal, said process comprising the following steps:
   (a) scanning a zone where said fixed markers are located with said emitted signal during passage of said mobile unit on said tracks;
   (b) storing in a database a description of said network in the form of a graph wherein nodes represent said fixed markers and branches connecting the nodes represent said tracks;
   (c) receiving a signal reflected back from a corresponding fixed marker; and
   (d) calculating the location of said mobile unit in said railroad network based on a comparison of said stored description of said network and said signal reflected back from said fixed marker.

5. A process according to claim 4, wherein a digital signature of said characteristic signal is compared with signatures related to said nodes of said graph which are stored in said database so as to determine the location of said mobile unit.

6. A process according to claim 4, wherein said sensing of each fixed marker is used for retiming an estimated position of said mobile unit on said tracks.

7. In a process for locating a mobile unit which travels on a network of railroad tracks, said network including a plurality of spaced-apart, fixed markers disposed on or near the tracks, and said mobile unit having a sensor disposed thereon, said process comprising the following steps:
   (a) sensing a characteristic signal in cooperation with each of said fixed markers as said mobile unit passes in close proximity to a corresponding one of said fixed markers;

(b) measuring a time separating the moment of detection of said characteristic signals;

(c) storing in a database a description of said network in the form of a graph wherein nodes represent said fixed markers and branches connecting the nodes represent said tracks;

(d) comparing the lengths of said branches which are stored in said database with said measured separation time to thereby obtain the location of said mobile unit in said railroad network.

8. A system for locating a mobile unit which travels on a network of railroad tracks having a plurality of spaced-apart, fixed markers being disposed on or near the tracks, said system comprising:

(a) a sensor disposed on said mobile unit for sensing said fixed markers and emitting a signal as said mobile unit passes in close proximity to a corresponding one of said fixed markers;

(b) a shaping circuit for said signal emitted by said sensor;

(c) means for measuring a distance traveled or a travel time between a previous fixed marker and said fixed marker with which said mobile unit is passing in close proximity;

(d) a database for storing a description of said network in the form of a graph wherein nodes represent said fixed markers and branches connecting the nodes represent said tracks; and (e) a circuit, which is controlled by said shaped signal, being connected to said measuring means and to said database, said circuit determining the location of said mobile unit in said network.

9. A system according to claim 8, wherein said sensor is a receiver disposed on said mobile unit, said receiver being sensitive to a signal reflected by said fixed markers and emitted by a radiation source disposed on said mobile unit so as to scan a zone where said fixed markers are located during motion of said mobile unit.

10. A system according to claim 9, further wherein said radiation source includes at least a radar disposed on said mobile unit, said radar comprising means for measuring the Doppler effect stemming from the motion of said mobile unit, and being connected to at least an antenna directed so as to scan said zone where said fixed markers are located, and also being connected to said signal shaping circuit.

11. A system according to claim 10, further wherein said fixed markers are comprised of a plurality of elbow pipes, each of said pipes having a diameter that is greater than a wave length of said radar signal and being placed so that said signal emitted by said radar penetrates through one end and that the signal coming out of the other end is picked up by an antenna having the same polarization.

12. A system according to claim 8, wherein said fixed markers are comprised of a plurality of contact line masts placed far from one another along an electrified track.

13. A system according to claim 8, wherein said fixed markers are comprised of trirectangular trihedra or assemblies of trihedra, metallic or metallized, and located far from one another along the track, in a zone scanned by the sensor.

14. A system according to claim 8, wherein said fixed markers are comprised of permanent magnets placed in the immediate vicinity of a rail and cooperating with a magnetic field detector which is integral to said mobile unit.

15. A system according to claim 8, wherein said fixed markers are comprised of points placed in the immediate vicinity of a rail and cooperating with a detecting wheel which is integral to said mobile unit.

* * * * *